No. 722,937. PATENTED MAR. 17, 1903.
A. L. W. BEGG.
STORE SERVICE APPARATUS.
APPLICATION FILED JULY 26, 1902.
NO MODEL.
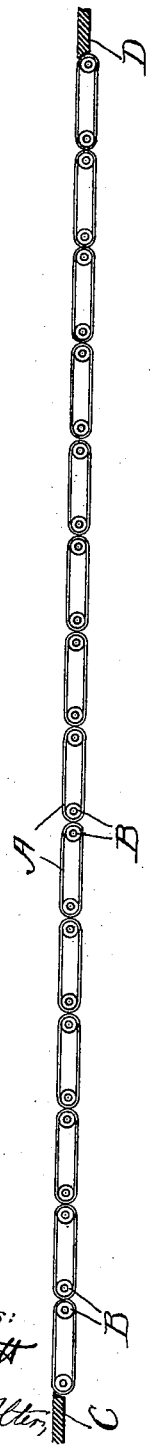
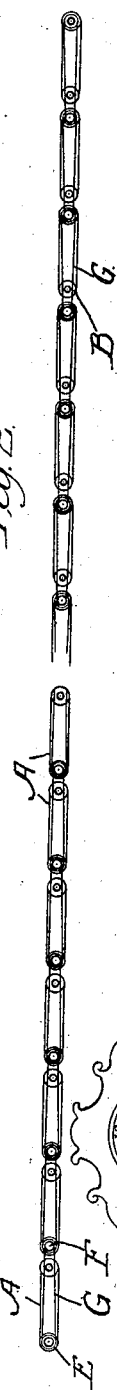
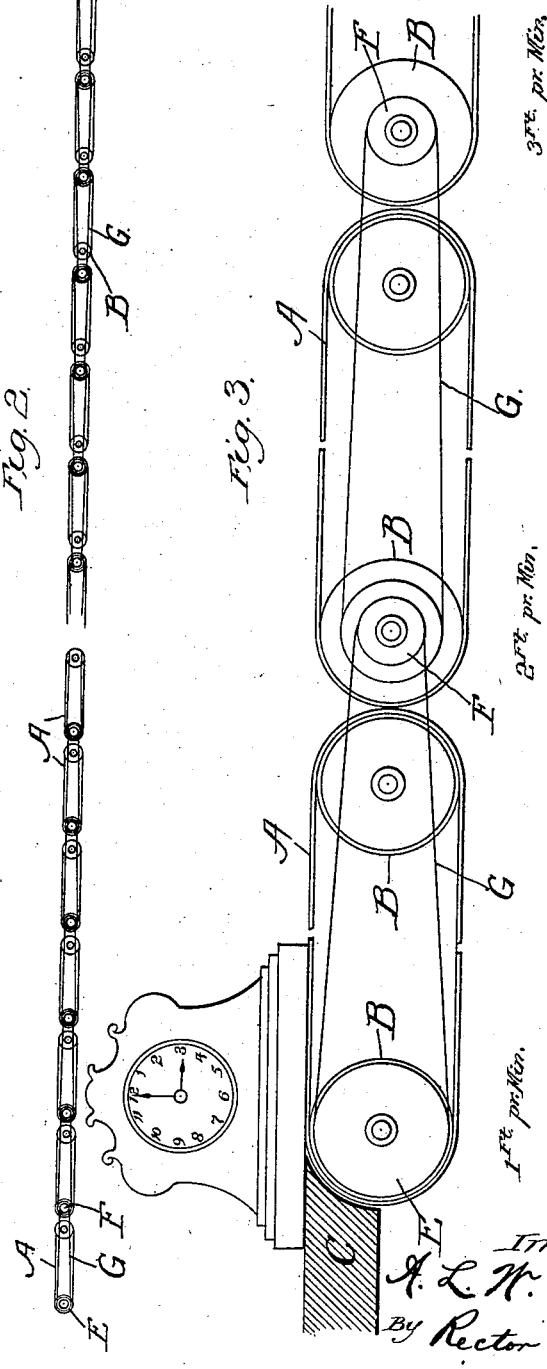

UNITED STATES PATENT OFFICE.

ALEXANDER L. W. BEGG, OF CHICAGO, ILLINOIS.

STORE-SERVICE APPARATUS.

SPECIFICATION forming part of Letters Patent No. 722,937, dated March 17, 1903.

Application filed July 26, 1902. Serial No. 117,136. (No model.)

*To all whom it may concern:*

Be it known that I, ALEXANDER L. W. BEGG, residing at Chicago, in the county of Cook and State of Illinois, have invented certain new and useful Improvements in Store-Service Apparatus, of which the following is a description, reference being had to the accompanying drawings, forming a part of this specification.
My invention has for its object the provision of a carrying apparatus by means of which fragile or weighty and bulky articles may be transported from the sales-counter to the bundle-wrapping counter or shipping-room with minimum risk of injury. Heretofore the carriers employed for such purposes have moved at the same rate of speed throughout their length, and while useful for some purposes they have been found impracticable for the handling of glassware and other fragile articles, as well as for heavy and bulky articles. To overcome these difficulties and objections, I have devised a carrying apparatus comprising a series of endless belts or aprons placed end to end and moving in line with each other at a gradually-increasing speed from the starting-point toward the destination, but at a gradually-decreasing speed approaching the destination-point. The first moving apron adjacent the starting-point is arranged to have a very slow movement, the next a slightly-greater one, and so on in the line of progression until a desirable maximum rate of movement is attained, which is continued until the destination-point is approached, when the movement of the successive aprons or belts in the series is gradually decreased until the last one is reached, which will have a very slow movement. A receiving table or platform is employed at the discharging end of the carrier, upon which the articles may be delivered by the carrier without the constant service of an attendant, and a similar platform is preferably employed at the receiving end of the carrier, from which the articles placed upon said platform are slid forward onto the carrier.

In the accompanying drawings, Figure 1 is a longitudinal section of my novel carrier;
Fig. 2, a side elevation; and Fig. 3 a detail side elevation of several of the endless aprons or belts at the starting end of the carrier, showing the driving means.

The same letters of reference are used to indicate corresponding parts in all the views.

A represents the series of endless belts or aprons, carried on rollers B and placed end to end in close proximity to each other and extending from the starting-platform C to the receiving-platform D. These endless belts or aprons may be of any desired width and composed of any suitable material, and the successive aprons may be driven at gradually-increasing rates of speed from the starting-platform toward the receiving-platform and at gradually-decreasing rates of speed approaching the receiving-platform by any suitable means. In the present instance I have illustrated all of the aprons as being driven from one of the rollers of the first belt in the series adjacent the starting-platform C. To this end the spindle of this roller is provided near one end with a pulley E, while the spindle of the rearmost roller of the second apron A is provided with a pulley F of slightly less diameter than the pulley E. The belt G passes around the two pulleys, so that the motion transmitted from the pulley E to the pulley F will cause the second apron in the series to be driven at a correspondingly higher rate of speed than the first apron. The second and third aprons are connected by similar pulleys and belt, and so on throughout the series until the maximum rate of movement is attained, whereupon the succeeding aprons will be connected by means of pulleys of equal size and connecting-belts, so that a uniform rate of speed will be maintained. At the end of the carrier approaching the receiving-platform D the speed of the successive aprons will be gradually decreased by the employment of pulleys E F of gradually-increasing size upon the spindles of the successive rollers until a minimum rate of movement is attained at the last apron in the series.

As will be understood from the foregoing, the upper sides of the endless belts or aprons A constitute a series of moving planes placed end to end and moving in line with each other at a gradually-increasing speed from the starting-point until a desired maximum rate of speed is attained, which maximum rate of speed is then maintained until the receiving-platform is approached, whereupon it is gradually decreased until it reaches a minimum at such platform. The upper sides of the endless aprons may be supported between the opposite rollers of the apron by any suitable table or platform to prevent sagging; but this will not be necessary if the aprons are maintained in taut condition and their supporting-rollers are not an undue distance apart.

Having thus fully described my invention, I claim—

1. The herein-described carrier, comprising a series of moving planes placed end to end and moving in line with each other at a gradually-increasing rate of speed from one end toward the middle of the carrier and at a gradually-decreasing rate of speed toward the opposite end of the carrier.

2. The herein-described carrier, comprising a series of moving planes placed end to end and moving in line with each other at a gradually-increasing rate of speed from one end toward the middle, at a uniform rate of speed in its middle portion, and at a gradually-decreasing rate of speed toward its opposite end.

3. The herein-described carrier, comprising a series of moving planes, composed of endless aprons or belts placed end to end, supporting-rollers for said aprons or belts, and means for driving the rollers of the successive belts at gradually-increasing rates of speed from one end of the carrier toward its middle and at gradually-decreasing rates of speed toward its opposite end.

4. The herein-described carrier, comprising a series of moving planes composed of endless belts or aprons placed end to end, suitable supporting-rollers for said aprons, and means for driving the rollers of the successive aprons at gradually-increasing rates of speed from one end of the carrier toward the middle, and at a uniform rate of speed in the middle portion of the carrier, and at gradually-decreasing rates of speed toward the opposite end of the carrier.

5. The herein-described carrier, comprising a series of moving planes placed end to end and moving in line with each other at a gradually-increasing speed from one end of the carrier toward its middle and at a gradually-decreasing speed toward its opposite end, in combination with a receiving-platform upon which the last plane in the carrier delivers the articles transported by the carrier.

6. The herein-described carrier, comprising a series of moving planes placed end to end and moving in line with each other at a gradually-increasing speed from one end toward the middle of the carrier, and at a gradually-decreasing speed toward the opposite end of the carrier, in combination with platforms at opposite ends of the carrier, from one of which the articles to be transported are moved upon the carrier and upon the other of which such articles are delivered by the carrier.

ALEXANDER L. W. BEGG.

Witnesses:
S. E. HEBBEN,
LOUIS B. ERWIN.